US006446168B1

(12) United States Patent
Normoyle et al.

(10) Patent No.: US 6,446,168 B1
(45) Date of Patent: Sep. 3, 2002

(54) METHOD AND APPARATUS FOR DYNAMICALLY SWITCHING A CACHE BETWEEN DIRECT-MAPPED AND 4-WAY SET ASSOCIATIVITY

(75) Inventors: Kevin Normoyle, Santa Clara; Bruce E. Petrick, Sunnyvale, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/532,995

(22) Filed: Mar. 22, 2000

(51) Int. Cl.$^7$ .............................................. G06F 12/00
(52) U.S. Cl. ...................... 711/128; 711/118
(58) Field of Search .................................. 711/128, 118

(56) References Cited

U.S. PATENT DOCUMENTS

| | | | | |
|---|---|---|---|---|
| 5,870,616 A | * | 2/1999 | Loper et al. ............. | 711/128 X |
| 6,185,657 B1 | * | 2/2001 | Moyer ....................... | 711/128 |
| 6,223,255 B1 | * | 4/2001 | Argade .................... | 711/128 X |

OTHER PUBLICATIONS

Sun Microsystems, Inc., Technical presentation on "UltraSPARC IIe, 64-bit UltraSPARC Performance for Embedded Applications," Embedded Processor Forum, May 4–5, 1999, 5 pages (no paper associated with the presentation).

* cited by examiner

Primary Examiner—David L. Robertson
(74) Attorney, Agent, or Firm—Rosenthal & Osha L.L.P.

(57) ABSTRACT

A method of dynamically switching mapping schemes for cache includes a microprocessor, a first mapping scheme, a second mapping scheme and switching circuitry for switching between the first mapping scheme and the second mapping scheme. The microprocessor is in communication with the cache through the switching circuitry and stores information within the cache using one of the first mapping scheme and second mapping scheme. Also, monitoring circuitry for determining whether one of instructions and load/store operations is using the cache is included. Further, the switching circuitry switches between the first mapping scheme and the second mapping scheme based on which one of instructions and load/store operations is using the cache.

21 Claims, 9 Drawing Sheets

NOTE: Tag Address is Pa [15:6], Data Array Address is Pa [15:3], a cache line is 8 data entries

METHOD AND APPARATUS FOR DYNAMICALLY SWITCHING A CACHE BETWEEN DIRECT-MAPPED AND 4-WAY SET ASSOCIATIVITY

FIELD OF THE INVENTION

The invention is related to cache memory and, in particular, to a method and apparatus for dynamically switching a cache memory from direct-mapped to set associativity.

BACKGROUND OF THE INVENTION

Generally, a microprocessor operates much faster than main memory can supply data to the microprocessor. Therefore, many computer systems temporarily store recently and frequently used data in smaller, but much faster cache memory. Cache memory may reside directly on the microprocessor chip (Level 1, or L1, cache) or may be external to the microprocessor (Level 2, or L2, cache).

Referring to FIG. 1, a typical computer system includes a microprocessor (10) having, among other things, a CPU (12), a load/store unit (14), and an on-board cache memory (16). The microprocessor (10) is connected to a main memory (18) that holds data and program instructions to be executed by the microprocessor (10). Internally, the execution of program instructions is carried out by the CPU (12). Data needed by the CPU (12) to carry out an instruction are fetched by the load/store unit 14. Upon command from the CPU (12), the load/store unit (14) searches for the data first in the cache memory (16), then in the main memory (18). Finding the data in the cache memory is referred to as a "hit." Not finding the data in the cache memory is referred to as a "miss."

The hit rate depends, in no small part, on the caching scheme or policy employed by the computer system, e.g., direct-mapped, or set associative. Generally, a set associative caching policy provides a higher hit rate than a direct-mapped policy. However, for some computer applications, a direct-mapped policy may provide better system performance due to a better hit rate. This depends on the address sequences used by the application, the allocation of memory pages to an application by the operating system, and whether virtual or physical addresses are used for addressing the cache.

An example of a direct-mapped cache memory is functionally depicted in FIG. 2A. In this example, a portion of the main memory (18) is stored or cached in a cache memory (20) having a tag part (22) and a data part (24). The tag part (22) and the data part (24) may be a single cache memory logically partitioned into two parts, or two actual, physical cache memories. In general, the tag part (22) stores the physical addresses of the locations in main memory being cached, and the data part (24) stores the data residing in those locations. Both the tag part (22) and the data part (24) share a common index that is used to reference the two parts.

In operation, the CPU requests data by issuing to the load/store unit an address which includes an index component and a tag component. The load/store unit then goes to the tag part (22) of the cache (20) and checks the specified index to see if that particular tag entry matches the specified tag. If yes, a hit has occurred, and the data corresponding to the specified index is retrieved and provided to the CPU. If no, then the requested data has to be obtained from main memory. For example, an address having an index component of '0' and a tag component of '32' will result in a hit, and data 'A' will be retrieved and sent to the CPU. However, there can only be one tag entry per index number and, therefore, a subsequent index component of '0' and a tag component of '24' will result in a miss. A set associative policy generally has a higher hit rate per access, as will be explained below.

An example of a set associative cache is functionally depicted in FIG. 2B. As in the previous example, a cache memory (26) is partitioned into a tag part (28) and a data part (30), with both parts sharing a common index. However, instead of a single entry per index, the tag part (28) and the data part (30) each have four entries, best shown here as rows and columns. A row of entries is called a "set" so that there are as many sets as there are index numbers, and a column of entries is called a "way" so that there are four ways for each index number. This particular cache policy, therefore, is commonly referred to as 4-way set associative. Those skilled in the art will appreciate that the set associative policy is commonly, but not limited to, 2-way to 8-way. Herein, examples are presented for 4-way set associativity, but the concepts are equally applicable to n-way set associativity.

In operation, when the load/store unit goes to search the tag part (28) at the specified index number, all four ways are compared to the specified tag component. If one of the four ways matches (a hit occurs), the corresponding way of the corresponding set in the data part (30) is sent to the CPU. Thus, in the previous example, a virtual address having an index component of '0' and tag component of '24' will be a hit because there are four tag entries per index number. If the first tag entry does not match, there are three more chances to find a match per access. Thus, effectively, the 4-way set associative policy allows the CPU to find cached data one of four ways.

As mentioned previously, cache memory may contain data already residing in main memory or new data generated by the microprocessor to be written later to main memory. Stale or outdated data are "flushed" from cache memory because of the need to replace a data block due to a miss or move all entries of a page back to main memory.

One method of flushing is by displacing the stale data with fresh data. Typically, a displacement flush is done for an entire "page" or group of index numbers with all data corresponding to the index numbers being replaced. This works fine for the direct-mapped cache where there is one-to-one correspondence between index number and tag entry. However, for a set associative cache where there are multiple tag entries per index number, replacement of a block of data is determined by the replacement policy.

SUMMARY OF THE INVENTION

In general, in one aspect, the present invention is a system for dynamically switching between mapping schemes for cache. The system comprises a microprocessor; a first mapping scheme; a second mapping scheme; and switching circuitry for switching between the first mapping scheme and the second mapping scheme, wherein the microprocessor is in communication with the cache through the switching circuitry and stores information within the cache using one of the first mapping scheme and second mapping scheme.

In accordance with one or more embodiments, the system may further comprise monitoring circuitry for determining whether one of instructions and load/store operations is using the cache, wherein the switching circuitry switches between the first mapping scheme and the second mapping scheme based on which one of instructions and load/store operations is using the cache. The system may further comprise monitoring circuitry for determining whether one of instructions and load/store operations is currently using the cache; and determining whether a mapping scheme switch has been requested for one of instructions and load/store operations, wherein the switching circuitry switches between the first mapping scheme and the second mapping scheme upon request if the one of instructions and load/store operations for which a mapping scheme switch is requested is not currently using the cache.

The system may further comprise an instruction unit in the cache; monitoring circuitry for determining whether instructions are currently using the instruction unit in the cache; and determining whether an instruction mapping scheme switch has been requested, wherein the switching circuitry switches between the first mapping scheme and the second mapping scheme for instructions upon request if the instructions are not currently using the instruction unit in the cache. The system may further comprise a load/store unit in the cache; monitoring circuitry for determining whether load/store operations are currently using the load/store unit in the cache; and determining whether a load/store operation mapping scheme switch has been requested, wherein the switching circuitry switches between the first mapping scheme and the second mapping scheme for load/store operations upon request if the load/store operations are not currently using the load/store unit in the cache. The system may further comprise control circuitry for halting the load/store operations currently using the load/store unit in the cache, wherein the switching circuitry switches between the first mapping scheme and the second mapping scheme for load/store operations upon request after halting the load/store operations currently using the load/store unit in the cache.

In general, in one aspect, the present invention is a software tool for dynamically switching mapping schemes for cache. The software tool comprises a first mapping scheme; a second mapping scheme, wherein a microprocessor in communication with the cache stores information within the cache using one of the first mapping scheme and the second mapping scheme; and a program executable on the microprocessor for switching between the first mapping scheme and the second mapping scheme.

In accordance with one or more embodiments, the software tool may further comprise a program stored on computer-readable media for determining whether one of instructions and load/store operations is using the cache; and determining whether a mapping scheme switch has been requested, wherein the switching between the first mapping scheme and the second mapping scheme is based on which one of instructions and load/store operations is using the cache. The software tool may further comprise a program stored on computer-readable media for determining whether one of instructions and load/store operations is currently using the cache; determining whether a mapping scheme switch has been requested; and switching between the first mapping scheme and the second mapping scheme upon request if the one of instructions and load/store operations is not currently using the cache.

The software tool may further comprise a program stored on computer-readable media for determining whether instructions are currently using the cache; determining whether an instruction mapping scheme switch has been requested; and switching between the first mapping scheme and the second mapping scheme upon request for instructions if the instructions are not currently using the cache. The software tool may further comprise a program stored on computer-readable media for determining whether load/store operations are currently using the cache; determining whether a load/store operation mapping scheme switch has been requested; and switching between the first mapping scheme and the second mapping scheme for load/store operations upon request if the load/store operations are not currently using the cache. The software tool may further comprise a program stored on computer-readable media for halting the load/store operations currently using the cache; and switching between the first mapping scheme and the second mapping scheme for load/store operations upon request after the load/store operations currently using the cache are halted.

In general, in one aspect, the present invention is a method for dynamically switching mapping schemes for cache. The method comprises providing a first mapping scheme; providing a second mapping scheme, wherein a microprocessor in communication with the cache stores information within the cache using one of the first mapping scheme and the second mapping scheme; and switching between the first mapping scheme and the second mapping scheme.

In accordance with one or more embodiments, the method may further comprise determining whether one of instructions and load/store operations is using the cache; and wherein the switching between the first mapping scheme and the second mapping scheme is based on which one of instructions and load/store operations are using the cache. The method may further comprise determining whether one of instructions and load/store operations is currently using the cache; determining whether a mapping scheme switch has been requested; and switching between the first mapping scheme and the second mapping scheme upon request if the one of instructions and load/store operations is not currently using the cache.

The method may further comprise determining whether instructions are currently using the cache; determining whether an instruction mapping scheme switch has been requested; and switching between the first mapping scheme and the second mapping scheme for instructions if the instructions are not currently using the cache. The method may further comprise determining whether load/store operations are currently using the cache; determining whether a load/store operation mapping scheme switch has been requested; and switching between the first mapping scheme and the second mapping scheme for load/store operations if the load/store operations are not currently using the cache. The method may further comprise halting the load/store operations currently using the cache; and switching between the first mapping scheme and the second mapping scheme for load/store operations upon request after the load/store operations currently using the cache are halted.

In general, in one aspect, the present invention is an apparatus for dynamically switching mapping schemes for cache. The apparatus comprises a microprocessor; a first mapping scheme; a second mapping scheme, wherein a microprocessor in communication with the cache stores information within the cache using one of the first mapping scheme and the second mapping scheme; and means for switching between the first mapping scheme and the second mapping scheme.

In accordance with one or more embodiments, the apparatus may further comprise determining whether one of instructions and load/store operations is using the cache; and means for switching between the first mapping scheme and the second mapping scheme based on which one of instructions and load/store operations is using the cache. The apparatus may further comprise means for determining whether one of instructions and load/store operations is currently using the cache; means for determining whether a mapping scheme switch has been requested; and means for switching between the first mapping scheme and the second mapping scheme upon request if the one of instructions and load/store operations is not currently using the cache.

Advantages of the present invention may include one or more of the following. In one or more embodiments, the present invention allows dynamic switching between direct mapping and set associative mapping of cache. Mapping modes can be switched without flushing the cache or restarting the system. This allows the instruction or data caching policy to be switched without affecting the other. Displacement flushing can be used straightforwardly while in direct mapping mode. The present invention determines whether instructions or load/store operations are accessing the cache prior to switching and thus, prevents mid-line replacement switching errors. The present invention halts load/store operations prior to switching allowing anytime dynamic switching for a load/store unit in the cache. Other advantages and features will become apparent from the following description, including the figures and the claims.

DETAILED DESCRIPTION

Figure 1:
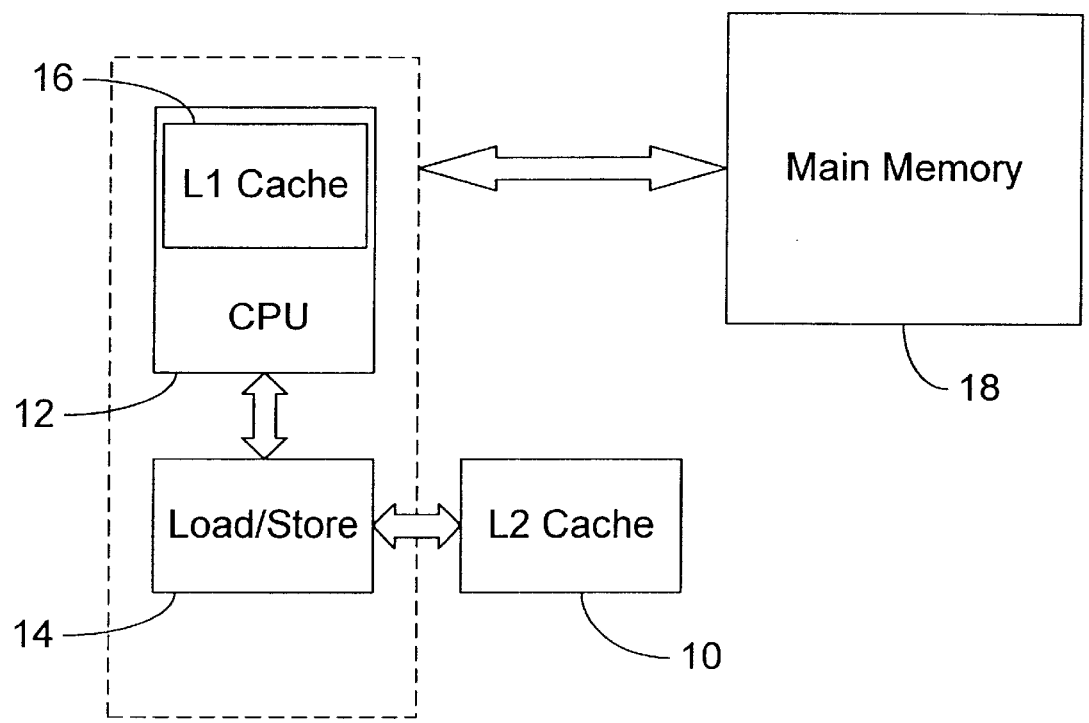
FIG. 1 shows a typical computer system.
Figure 2A:
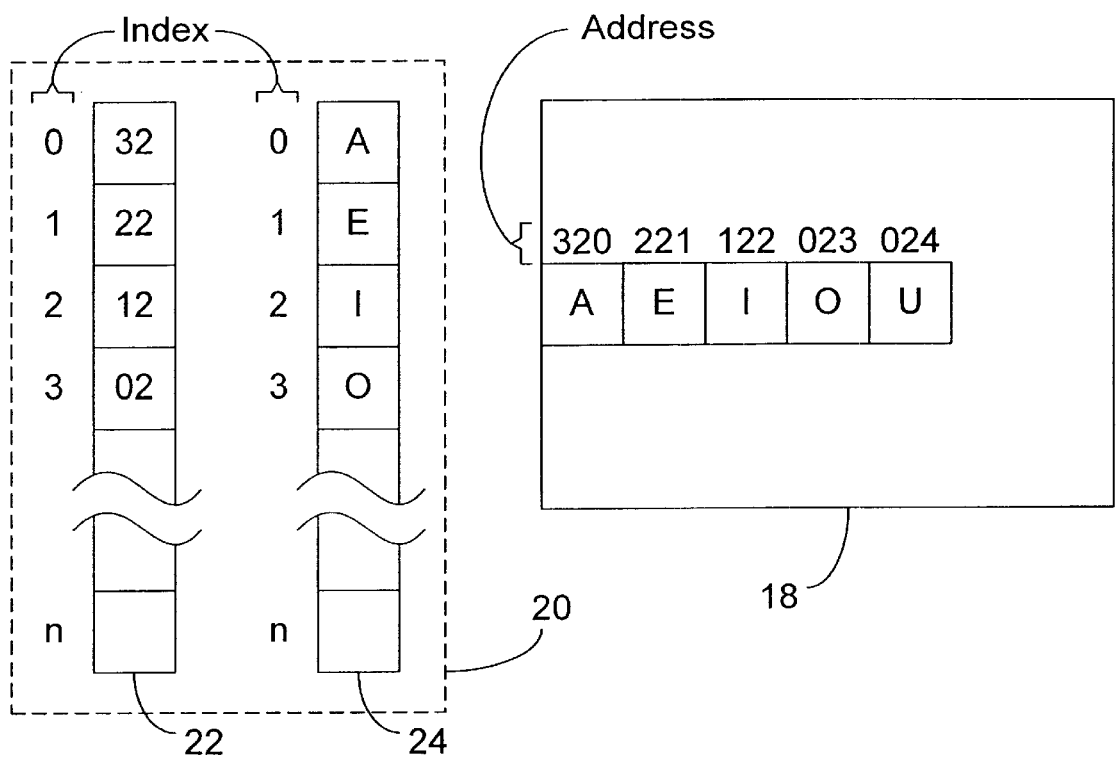
FIG. 2A shows a functional example of a direct-mapped cache memory.
Figure 2B:
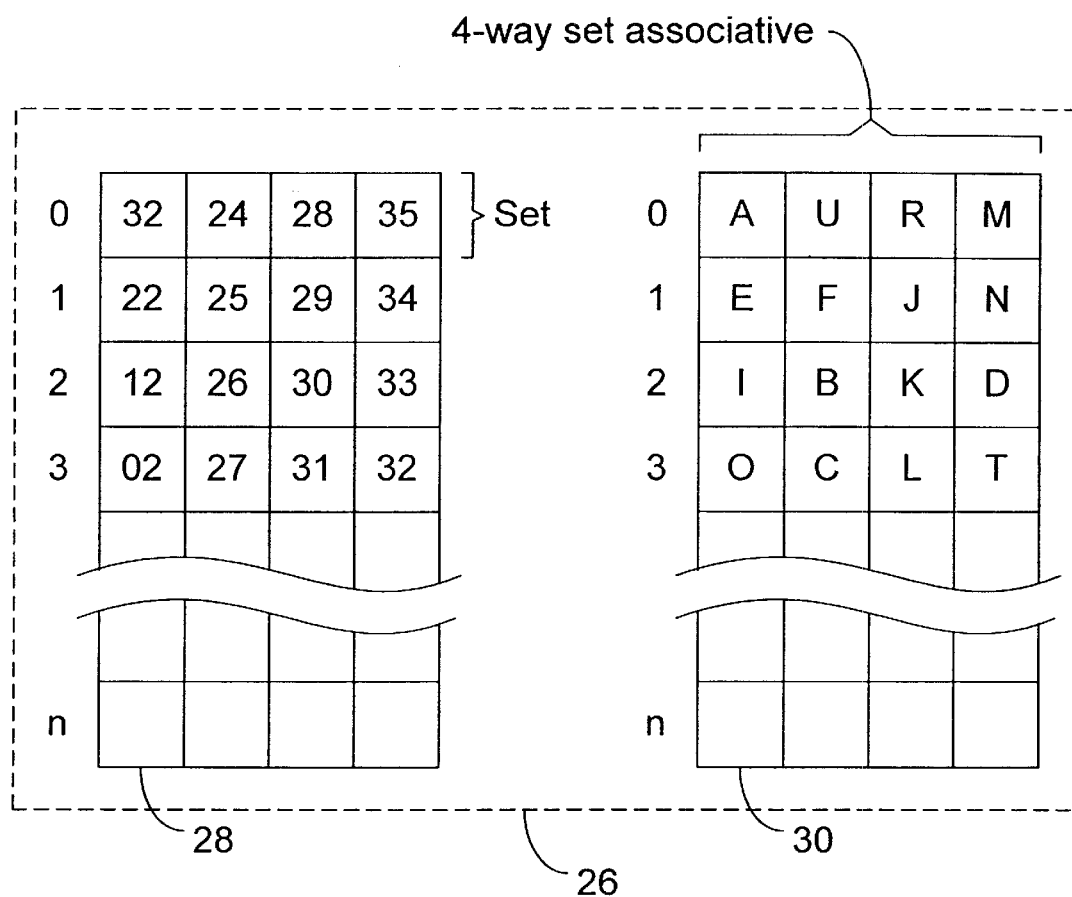
FIG. 2B shows a functional example of a set associative cache.
Figure 3:
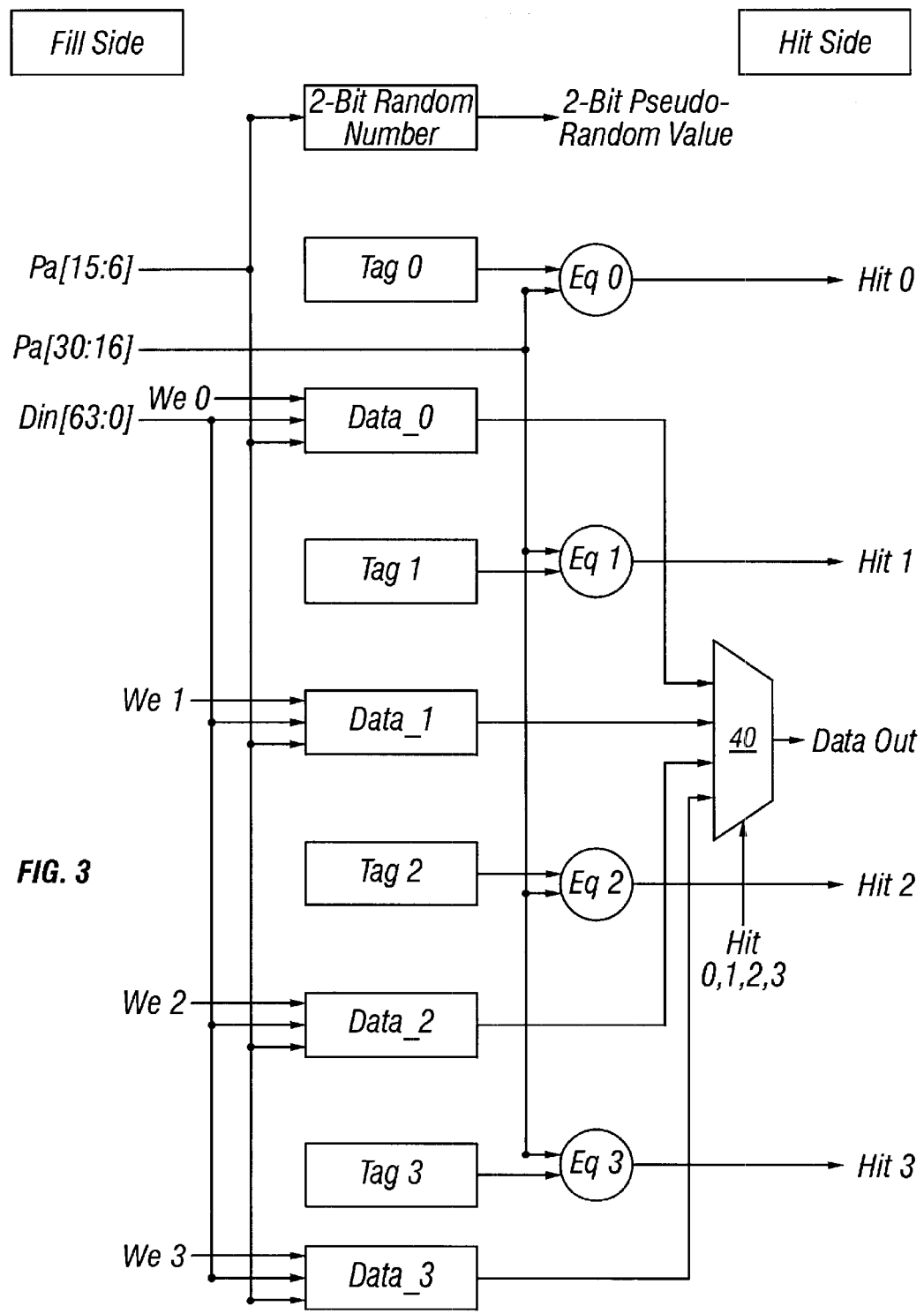
FIG. 3 shows a L2 cache tag/data RAM in accordance with an embodiment of the present invention.

Generally, in one or more embodiments, the invention can be embodied in a technique for dynamically switching between mapping schemes for cache. Referring to the drawings, wherein like reference characters are used for like parts throughout the several views, FIG. 3 shows a L2 cache tag/data RAM in accordance with an embodiment of the present invention.

As can be seen, L2 cache is a unified memory which holds recently used data or instructions. Data is accessed by mapping the physical address using an index which consists of pa[15:6]. For lookup in a memory which has 1 kilobyte (1K) entries, pa[15:6] is equal to 10 address bits. The address bits pa[5:0] are not used in the lookup, but correspond to the byte location within a cache line. The values of address bits pa[30:16] are stored in the L2 cache tag memory and are used in the tag comparison to determine if a cache line is present in the L2 cache. A direct-mapped cache only has 1 entry at a particular index, i.e., pa[15:6]; however, a 4-way set associative cache has 4 cache lines, each having a different tag value, stored at a particular index.

When a Level 1 (L1) data or instruction cache miss occurs, the physical address is passed to the L2 cache and all 4 entries at a particular index are accessed in parallel. There are 4 tag comparators (EQ[0:3]), which check for a match between the new pa[30:16] and each of the values in the 4 entries in tag memory (tag[0:3]) at the particular index. If a hit occurs, the data (data_[0:3]) is accessed from the way (data_[0:3]) of that hit (hit[0:3]) through a multiplexer (MUX) (40). If a miss occurs, the L2 cache logic retrieves the missing data from main memory, installs the new data into the correct way at that index, copies back any stale data to main memory, and sources the new data back to the running program.

Many processors, for example, the UltraSPARC™-IIi processor produced by Sun Microsystems, Inc. of Palo Alto, Calif., have a direct-mapped L2 cache. Because of this direct-mapping, a displacement flush is used, and flushing a cache line out of the L2 cache is straightforward. See section 8 of the UltraSPARC-IIi user's manual, which is hereby incorporated in its entirety by reference. However, the process of flushing a cache line out of the L2 cache having 4-way associativity is slightly more complicated than that involved with direct-mapped L2 cache. When using L2 cache having 4-way associativity, a displacement flush can still be used. However, because the replacement algorithm is a pseudo-random generator, the displacement flush has to be done many times with certain restrictions.

In a processor having both mapping modes, i.e., direct-mapping and 4-way associative mapping, the straightforward displacement flush could be executed during the direct-mapping mode. Switching between modes can be controlled by setting a bit in a control status register (CSR). However, certain issues arise in implementation of such a dynamically switchable configuration. For example, the policy cannot change while an L2 cache miss is being handled.

Because there are 4 cache lines stored at each pa[15:6] index, there need to be 4 comparators at each index. Also, when installing a new cache line at a particular index, either because an entry is invalid, or because of an eviction the logic must use some algorithm to determine into which way the new cache line will be stored. Those skilled in the art will appreciate that there exist several algorithms, for example, random or LRU, that can be used to accomplish this task. One particular implementation involves using a pseudo-random LFSR (longitudinal feedback shift register) to determine which way to evict on misses or flushes.

Each index has a 2-bit number stored at that index. The 2-bit number is used by the logic to determine where to put the new cache line. This allows for a guaranteed stable number, which stays constant throughout the various tag checks, victim line removals, and installation of the new lines. At the last stage in the new line installation, the 2-bit number is updated with the latest number from the LFSR register. This latest number is then used the next time a cache line is replaced at the index. Then, the LFSR register is updated for the next miss. There is only 1 LFSR counter, and the latest number is copied into the 2-bit random access memory (RAM) at the index of the missing line, where it remains to be used at that index until another replacement is needed at that index.

To convert to a direct-mapped L2 cache, the logic uses pa[17:16] instead of the 2-bit pseudo-random number in the line replacement. Thus, the replacement policy is deterministic and the displacement flush can be used straightforwardly. In other words, when changing between direct-mapped and 4-way associative mapping L2 cache policies, the update policy for new lines brought in when a miss occurs must also be changed. The four comparators are still used in the hit determination in the L2 cache block. This hit is always used to direct the correct way data back to the L2 control logic and, ultimately, the L1 data or instruction caches.

Next, because of the pipelined nature of the L2 cache, there can be multiple operations happening at a single time. Thus, if the L2 cache line replacement algorithm was changed in the middle of a line replacement, part of the replacement would be completed using 1 replacement algorithm, and part of the replacement would be completed using the other, and an error would be caused. Therefore, it is important to ensure that no outstanding operations exist in the L2 cache before the replacement algorithm is changed.

The UltraSPARC-IIi has a built in mechanism for ordering load/store operations which can be used to this end. The MEMBAR #Sync instruction (see the UltraSPARC-IIi user's manual for a description) can be used with load/stores; however, there is no corresponding mechanism for use with instructions. In view of this, the CSR has two control bits. One control bit makes the L2 cache line replacement policy switch between direct and 4-way for loads/stores, while the other control bit handles the switching for instructions. It is recommended that the instruction replacement policy only be changed when there are no outstanding instruction misses in the L2 cache pipeline. This is the case at boot time and when a program is running in non-cached space.

Figure 4:
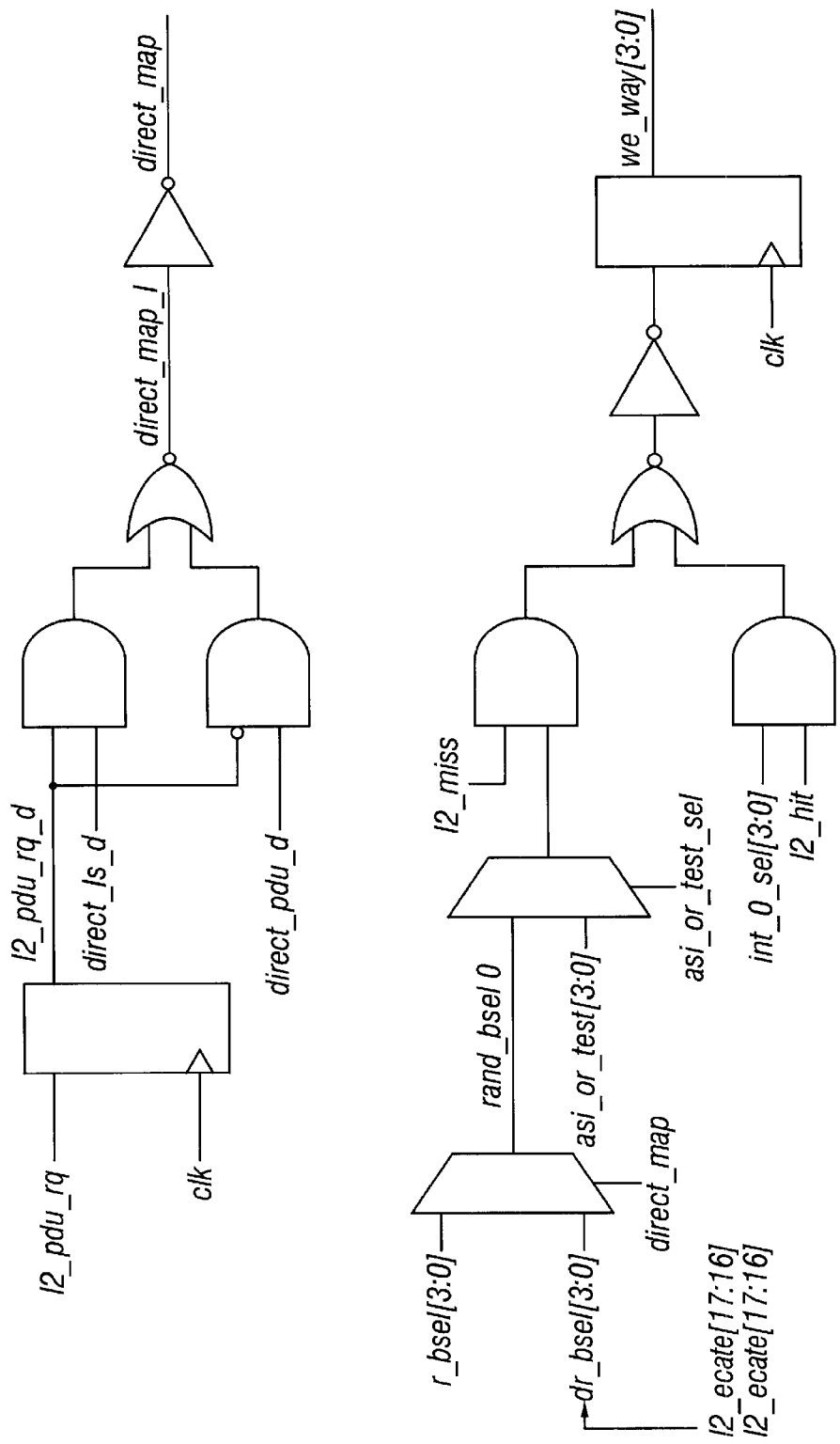
FIG. 4 shows logic that implements dynamic switching in accordance with an embodiment of the present invention.
Figure 5:
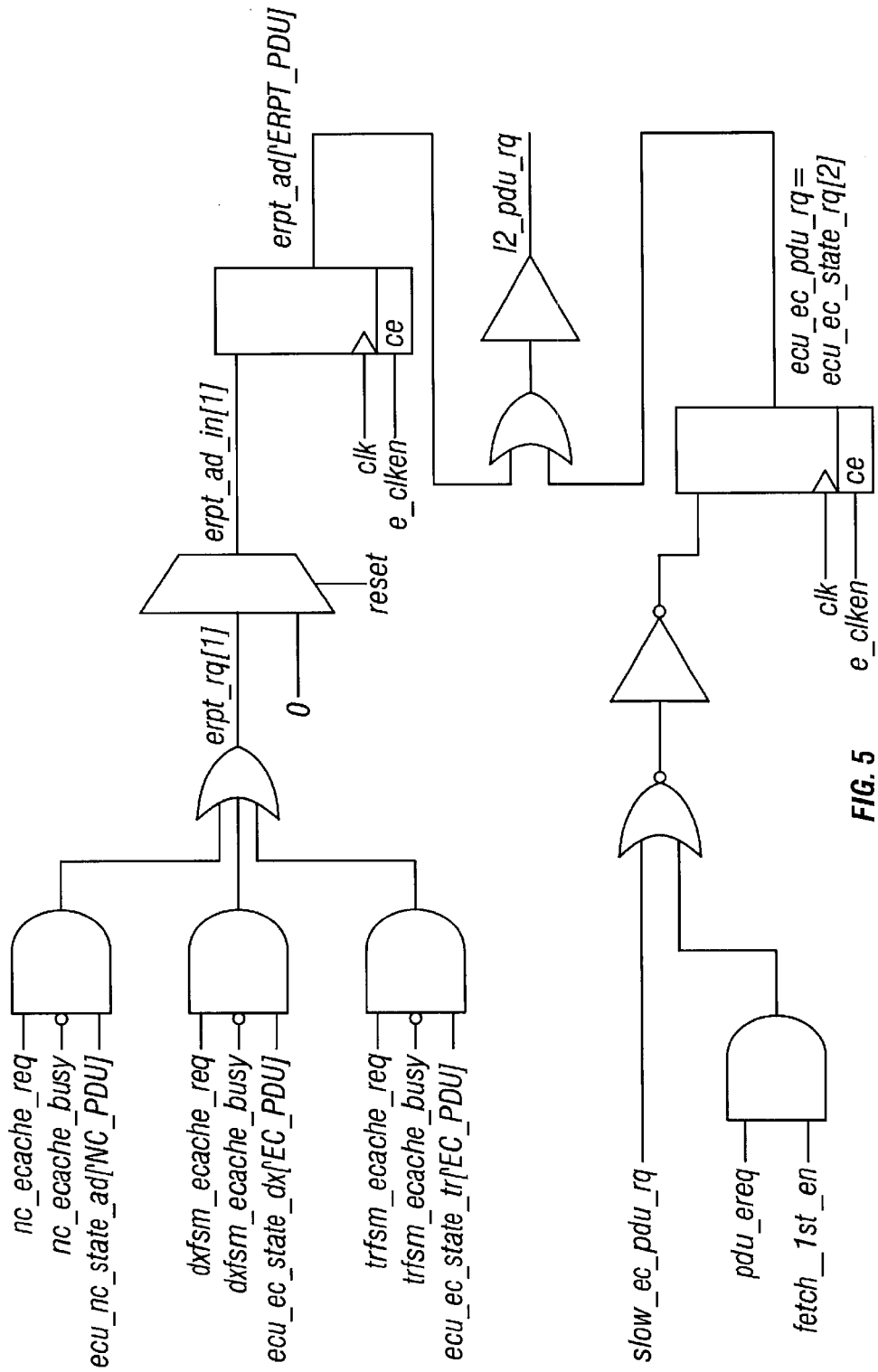
FIG. 5 shows logic that implements dynamic switching in accordance with an embodiment of the present invention.

Referring to FIGS. 4 and 5, in accordance with one or more embodiments of the present invention, the logic that implements the dynamic switching of L2 cache replacement policies is separate from the current logic in existing processors. The new logic manages the 4-way mechanisms, including tag comparators, way selection, write modes, way replacement selection, diagnostics, etc.

As discussed above, each of the 4 ways at a particular index have a tag comparator to determine whether a hit or miss occurs. Thus, on the read side, the direct-mapping and 4-way associative mapping are identical and, therefore, the dynamic switching is transparent. In contrast, on the write, or fill, side of the L2 cache, the replacement policy is determined by the CSR bits. The two new CSR bits are forwarded from the modified existing logic to the new L2 cache logic. One bit is for instructions, and one is for load/store replacement. There is also another signal from the modified existing logic to the new L2 cache logic, which indicates if the current L2 cache access is caused by an instruction.

This signal is called 12_pdu_rq. Because the accesses to the L2 cache are pipelined, there can be several accesses going down the pipeline. The new signal, 12_pdu_rq, is decoded in the modified existing logic, indicating that the next unit to get access in the pipeline is from the instruction unit. This signal is pipelined along with the request, address, etc.

When it reaches the L2 cache control logic, along with the request, etc., it is used to multiplex (MUX) one of the two new CSR bits onto the signal called direct_map. Thus, if the current access is not for the instruction accesses, the signal direct_ls_d will be MUXed to direct_map, and that will determine the fill replacement policy. If, however, the current transaction is for instructions, the CSR bit, direct_pdu_d, is MUXed to the signal direct_map, and it determines the fill policy.

Recall that the CSR bits cannot be changed while there is an outstanding operation to the L2 cache for its particular type of fill, e.g., instructions or load/store. Thus, when the CSR bits (direct_is_d and direct_pdu_d) are changing, there cannot be outstanding transactions to its unique type. That is, direct_ls_d cannot change if there are outstanding loads/stores, but can change if there are instructions outstanding. Similarly, direct_pdu_d cannot change if there are outstanding instructions, but can change if there are outstanding load/stores. Further, the load/stores can be managed with MEMBARS, but instructions cannot, so the instruction CSR should only change when the program is running out of non-cache space.

Figure 6:
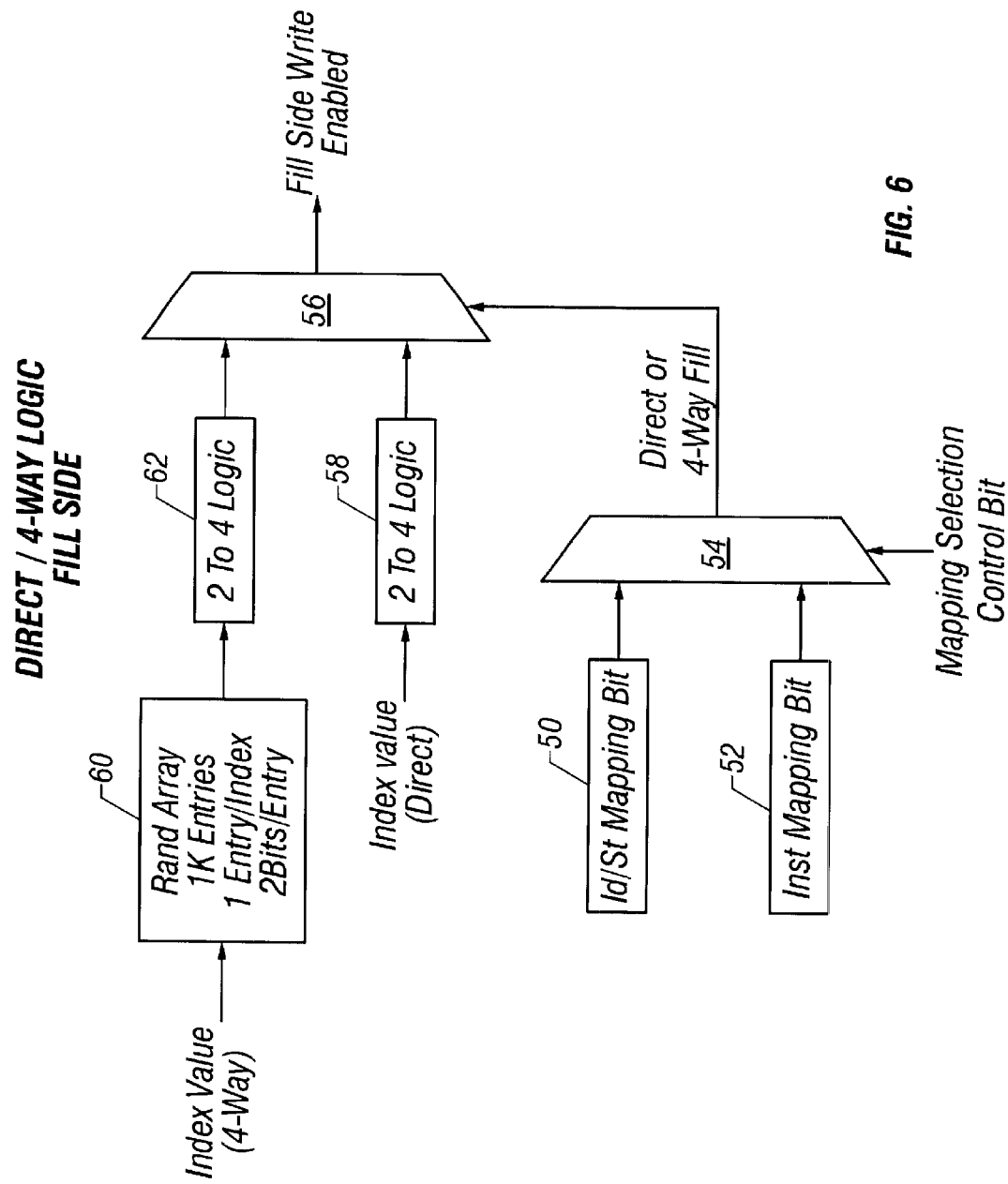
FIG. 6 shows a process in accordance with an embodiment of the present invention.

FIG. 6 shows a block diagram of the write enables on the fill side logic discussed above. As can be seen, the bits for controlling mapping of load/store operations (50) and instructions (52) are selectively passed through a MUX (54) depending on the mapping selection control bit signal. Control logic determines if the current transaction is load/store or instruction L2 cache access and varies the mapping selection control bit signal accordingly.

The output from the MUX (54) is then used to control a MUX (56) that produces replacement the fill side write enabled signal. Inputs to the MUX (56) are mapping scheme specific index values, through logic (58), and through logic (60 and 62). Logic (58) is simply a 2 to 4 converter, which receives 2-bits and outputs across 4 output lines according to the 2-bit value received. Logic 60 is also a 2 to 4 converter, and logic 62 is a random array, e.g., an LFSR generator.

Figure 7:
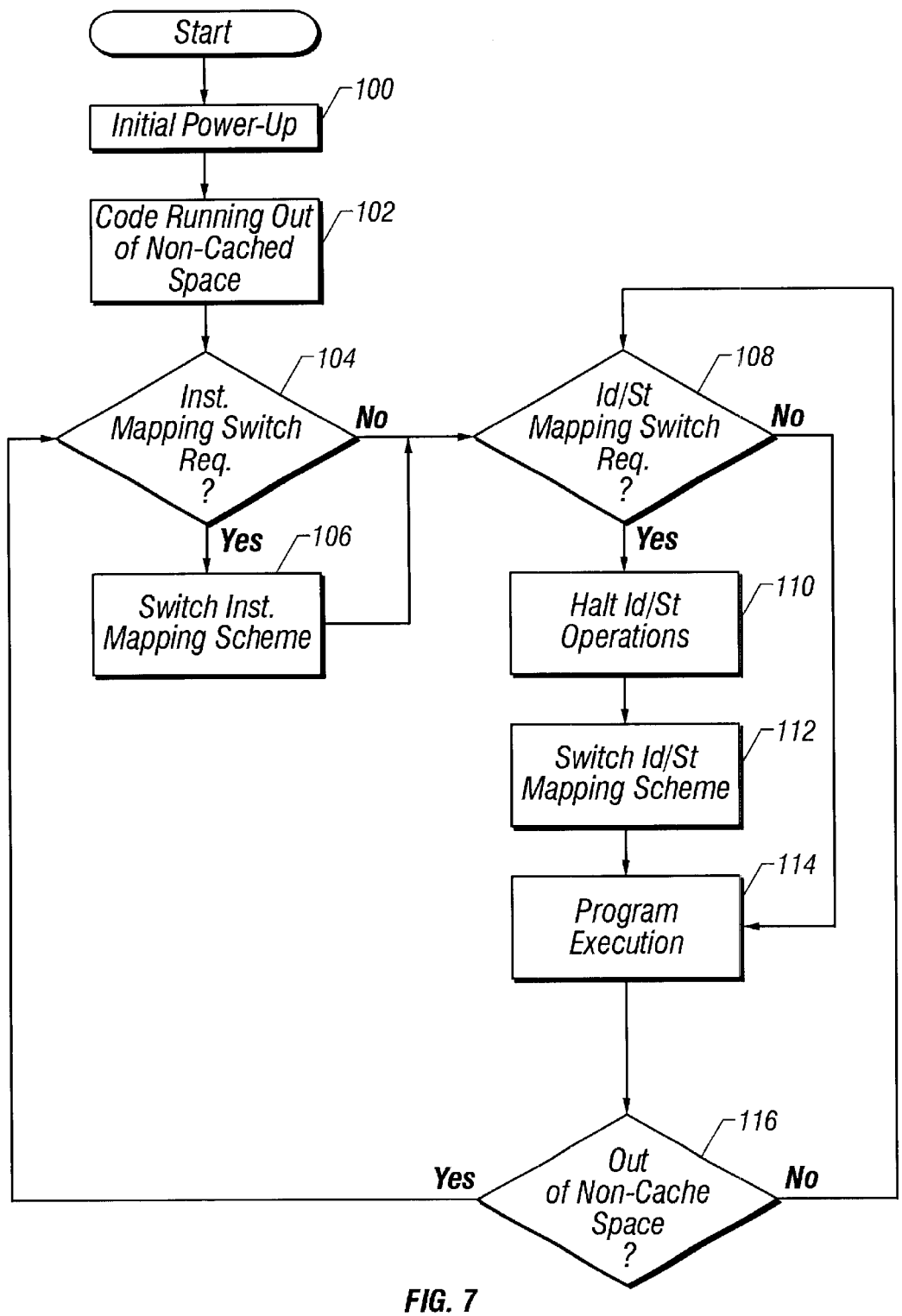
FIG. 7 shows a software flow chart for changing CSR bits in an embodiment of the present invention.

Referring to FIG. 7, in accordance with one or more embodiments, the present invention is a system that follows the shown process. The process begins with the initial power-up (step 100). At initial power-up, code is running out of non-cache space (step 102) and the system determines whether an instruction mapping scheme request has been requested (step 104). If so, the system can switch the instruction mapping scheme because the code is running out of non-cache space and therefore can be switched without error (step 106).

After switching the instruction mapping scheme or if no instruction mapping scheme switch has been requested, the system determines if a load/store mapping switch has been requested (step 108). If so, the system halts any load/store operations using the cache (110) and switches the load/store mapping scheme (step 112). Then, the system continues with normal program execution (step 114). Also, if no load/store mapping scheme switch is requested, the system continues directly with normal program execution (step 114).

Once normal program execution has begun, the system monitors whether programs are being run out of non-cache space (step 116). If a program is being run out of non-cache space, i.e., the instructions are not using the cache, the system again performs a determination of whether an instruction mapping scheme switch has been requested (step 104). This is because instruction mapping schemes can be switched without error when instructions are not using the cache. The process then proceeds as earlier described.

In contrast, load/store operations can be controlled by the system. Therefore, if a program is running in cache space (step 116), the system determines whether a load/store mapping scheme switch has been requested (step 108). The process then proceeds as earlier described. Thus, after initial power-up, the system monitors for load/store mapping scheme switch requests and whether instructions are using the cache (step 116).

Figure 8:
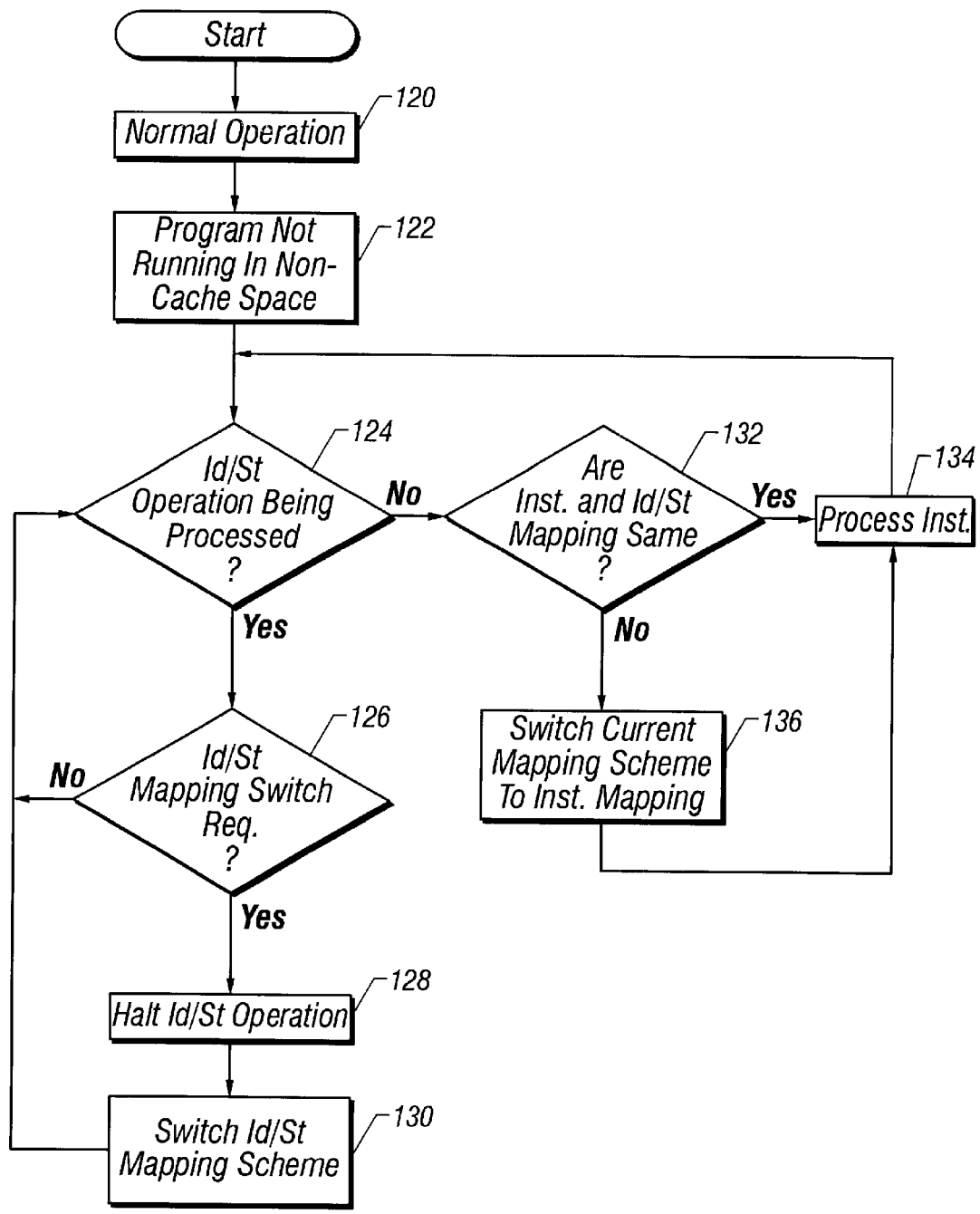
FIG. 8 shows a software flow chart for general operation of an embodiment of the present invention.

Referring to FIG. 8, an exemplary situation is shown during normal operations (step 120) where programs are not running in non-cache space (step 122). The system determines whether load/store operations are being processed (step 124). If so, the system determines whether a load/store mapping scheme switch is requested (step 126). If no switch is requested, the system continues to monitor the operations (step 124) and switch requests (step 126). If a switch is requested (step 126), load/store operations are halted (step 128), the mapping scheme for load/store operations is switched (step 130), and the system returns to monitoring operations (step 124).

If the system determines that an instruction is being processed (step 124), the mapping schemes for instructions and load/store operations are compared to determine if the same mapping schemes are being used (step 132). If so, the system simply continues with processing the instruction (134) and returns to monitoring operations (step 124). However, if there has been a load/store operation mapping scheme switch and thus, instructions and load/store operations are being processed using different mapping schemes (step 132), the system switches to the instruction mapping scheme (step 136) prior to processing the instruction (step 134). By dynamically switching between mapping schemes, the system allows the mapping scheme for load/store operations to be changed at any time, while still allowing instructions to be processed without error. Alternatively, the system could monitor whether instructions or load/store operations are being processed and dynamically switch to the appropriate mapping scheme for that type.

Advantages of the present invention may include one or more of the following. In one or more embodiments, the present invention allows dynamic switching between direct mapping and 4-way associative mapping of cache. Mapping modes can be switched without flushing the cache or restarting the system. This allows the instruction or data caching policy to be switched without affecting the other. Displacement flushing can be used straightforwardly while in direct mapping mode. The present invention determines whether instructions or load/store operations are accessing the cache prior to switching and thus, prevents mid-line replacement switching errors. The present invention halts load/store operations prior to switching allowing anytime dynamic switching for a load/store unit in the cache.

While the present invention has been described with respect to a limited number of preferred embodiments, those skilled in the art will appreciate numerous modifications and variations therefrom. The appended claims are intended to cover all such modifications and variations which occur to one of ordinary skill in the art.

What is claimed is:

1. A system for dynamically switching between mapping schemes for cache, the system comprising:
    a microprocessor;
    a first mapping scheme;
    a second mapping scheme; and
    switching circuitry for switching between the first mapping scheme and the second mapping scheme,
    wherein the microprocessor is in communication with the cache through the switching circuitry and stores information within the cache using one of the first mapping scheme and second mapping scheme.

2. The system for dynamically switching mapping schemes for cache of claim 1, further comprising:
    monitoring circuitry for determining whether one of instructions and load/store operations is using the cache,
    wherein the switching circuitry switches between the first mapping scheme and the second mapping scheme based on which one of instructions and load/store operations is using the cache.

3. The system for dynamically switching mapping schemes for cache of claim 1, further comprising:
    monitoring circuitry for
        determining whether one of instructions and load/store operations is currently using the cache; and
        determining whether a mapping scheme switch has been requested for one of instructions and load/store operations,
    wherein the switching circuitry switches between the first mapping scheme and the second mapping scheme upon request if the one of instructions and load/store operations for which a mapping scheme switch is requested is not currently using the cache.

4. The system for dynamically switching mapping schemes for cache of claim 1, further comprising:
    an instruction unit in the cache; and
    monitoring circuitry for
        determining whether instructions are currently using the instruction unit in the cache; and
        determining whether an instruction mapping scheme switch has been requested,
    wherein the switching circuitry switches between the first mapping scheme and the second mapping scheme for instructions upon request if the instructions are not currently using the instruction unit in the cache.

5. The system for dynamically switching mapping schemes for cache of claim 1, further comprising:
    a load/store unit in the cache; and
    monitoring circuitry for
        determining whether load/store operations are currently using the load/store unit in the cache; and
        determining whether a load/store operation mapping scheme switch has been requested,
    wherein the switching circuitry switches between the first mapping scheme and the second mapping scheme for load/store operations upon request if the load/store operations are not currently using the load/store unit in the cache.

6. The system for dynamically switching mapping schemes for cache of claim 5, further comprising:
    control circuitry for halting the load/store operations currently using the load/store unit in the cache,
    wherein the switching circuitry switches between the first mapping scheme and the second mapping scheme for load/store operations upon request after halting the load/store operations currently using the load/store unit in the cache.

7. A software tool for dynamically switching mapping schemes for cache, the software tool comprising:
    a first mapping scheme;
    a second mapping scheme,
    wherein a microprocessor in communication with the cache stores information within the cache using one of the first mapping scheme and the second mapping scheme; and
    a program executable on the microprocessor for switching between the first mapping scheme and the second mapping scheme.

8. The software tool for dynamically switching mapping schemes for cache of claim 7, further comprising:
    a program stored on computer-readable media for
        determining whether one of instructions and load/store operations is using the cache; and determining whether a mapping scheme switch has been requested, wherein the switching between the first mapping scheme and the second mapping scheme is based on which one of instructions and load/store operations is using the cache.

9. The software tool for dynamically switching mapping schemes for cache of claim 7, further comprising:

a program stored on computer-readable media for
determining whether one of instructions and load/store operations is currently using the cache;
determining whether a mapping scheme switch has been requested;
switching between the first mapping scheme and the second mapping scheme upon request if the one of instructions and load/store operations is not currently using the cache.

10. The software tool for dynamically switching mapping schemes for cache of claim 7, further comprising:

a program stored on computer-readable media for
determining whether instructions are currently using the cache;
determining whether an instruction mapping scheme switch has been requested; and
switching between the first mapping scheme and the second mapping scheme upon request for instructions if the instructions are not currently using the cache.

11. The software tool for dynamically switching mapping schemes for cache of claim 7, further comprising:

a program stored on computer-readable media for
determining whether load/store operations are currently using the cache;
determining whether a load/store operation mapping scheme switch has been requested; and
switching between the first mapping scheme and the second mapping scheme for load/store operations upon request if the load/store operations are not currently using the cache.

12. The software tool for dynamically switching mapping schemes for cache of claim 11, further comprising:

a program stored on computer-readable media for
halting the load/store operations currently using the cache; and
switching between the first mapping scheme and the second mapping scheme for load/store operations upon request after the load/store operations currently using the cache are halted.

13. A method for dynamically switching mapping schemes for cache, the method comprising:

providing a first mapping scheme;

providing a second mapping scheme, wherein a microprocessor in communication with the cache stores information within the cache using one of the first mapping scheme and the second mapping scheme; and switching between the first mapping scheme and the second mapping scheme.

14. The method for dynamically switching mapping schemes for cache of claim 13, further comprising:

determining whether one of instructions and load/store operations is using the cache; and wherein the switching between the first mapping scheme and the second mapping scheme is based on which one of instructions and load/store operations are using the cache.

15. The method of dynamically switching mapping schemes for cache of claim 13, further comprising:

determining whether one of instructions and load/store operations is currently using the cache;
determining whether a mapping scheme switch has been requested;
switching between the first mapping scheme and the second mapping scheme upon request if the one of instructions and load/store operations is not currently using the cache.

16. The method of dynamically switching mapping schemes for cache of claim 13, further comprising:

determining whether instructions are currently using the cache;
determining whether an instruction mapping scheme switch has been requested; and
switching between the first mapping scheme and the second mapping scheme for instructions if the instructions are not currently using the cache.

17. The method of dynamically switching mapping schemes for cache of claim 13, further comprising:

determining whether load/store operations are currently using the cache;
determining whether a load/store operation mapping scheme switch has been requested; and
switching between the first mapping scheme and the second mapping scheme for load/store operations if the load/store operations are not currently using the cache.

18. The method of dynamically switching mapping schemes for cache of claim 17, further comprising:

halting the load/store operations currently using the cache; and
switching between the first mapping scheme and the second mapping scheme for load/store operations upon request after the load/store operations currently using the cache are halted.

19. An apparatus for dynamically switching mapping schemes for cache, the apparatus comprising:

a microprocessor;

a first mapping scheme;

a second mapping scheme, wherein a microprocessor in communication with the cache stores information within the cache using one of the first mapping scheme and the second mapping scheme; and means for switching between the first mapping scheme and the second mapping scheme.

20. The apparatus for dynamically switching mapping schemes for cache of claim 19, further comprising:

determining whether one of instructions and load/store operations is using the cache;

means for switching between the first mapping scheme and the second mapping scheme based on which one of instructions and load/store operations is using the cache.

21. The apparatus for dynamically switching mapping schemes for cache of claim 19, further comprising:

means for determining whether one of instructions and load/store operations is currently using the cache;
means for determining whether a mapping scheme switch has been requested;
means for switching between the first mapping scheme and the second mapping scheme upon request if the one of instructions and load/store operations is not currently using the cache.

* * * * *